United States Patent
Baumeister et al.

(10) Patent No.: US 9,740,518 B2
(45) Date of Patent: Aug. 22, 2017

(54) CONFLICT DETECTION CIRCUIT FOR RESOLVING ACCESS CONFLICT TO PERIPHERAL DEVICE BY MULTIPLE VIRTUAL MACHINES

(75) Inventors: Markus Baumeister, Munich (DE); Frank Steinert, Rosenheim (DE)

(73) Assignee: NXP USA, Inc., Austin, TX (US)

( * ) Notice: Subject to any disclaimer, the term of this patent is extended or adjusted under 35 U.S.C. 154(b) by 127 days.

(21) Appl. No.: 14/422,058

(22) PCT Filed: Sep. 12, 2012

(86) PCT No.: PCT/IB2012/054737
§ 371 (c)(1),
(2), (4) Date: Feb. 17, 2015

(87) PCT Pub. No.: WO2014/041395
PCT Pub. Date: Mar. 20, 2014

(65) Prior Publication Data
US 2016/0117183 A1    Apr. 28, 2016

(51) Int. Cl.
*G06F 9/455* (2006.01)
*G06F 9/52* (2006.01)
*G06F 9/50* (2006.01)

(52) U.S. Cl.
CPC ........ *G06F 9/45558* (2013.01); *G06F 9/5077* (2013.01); *G06F 9/526* (2013.01);
(Continued)

(58) Field of Classification Search
CPC .... G06F 9/45558; G06F 9/5077; G06F 9/526; G06F 2009/45591; G05B 2219/2205
See application file for complete search history.

(56) References Cited

U.S. PATENT DOCUMENTS

| 4,890,223 A | 12/1989 | Cruess et al. |
| 6,775,750 B2 | 8/2004 | Krueger |

(Continued)

FOREIGN PATENT DOCUMENTS

| JP | 2003150450 | 5/2003 |
| JP | 2009524140 | 6/2009 |

(Continued)

OTHER PUBLICATIONS

International Search Report and Written Opinion correlating to PCT/IB2012/054737 dated Feb. 20, 2013.
(Continued)

*Primary Examiner* — James J Lee

(57) ABSTRACT

A system-on-chip device comprises a core supporting a first virtual machine image and a virtual machine monitoring unit capable of communicating with the first virtual machine image. A shareable resource is also provided as well as a conflict detection unit capable of communicating with the virtual machine monitoring unit and the first virtual machine image. The conflict detection unit is arranged to detect, when in use, an access conflict caused by more than one virtual machine image attempting to access initially the shareable resource. The conflict detection unit is arranged to refer, when in use, the access conflict in response to detection thereof to the virtual machine monitoring unit for resolving of the access conflict, thereby handling the access conflict before the virtual machine monitoring unit.

16 Claims, 4 Drawing Sheets

(52) U.S. Cl.
CPC ............... *G05B 2219/2205* (2013.01); *G06F 2009/45591* (2013.01)

(56) References Cited

U.S. PATENT DOCUMENTS

| | | | |
|---|---|---|---|
| 6,981,149 | B1 | 12/2005 | Housley et al. |
| 7,107,382 | B2 | 9/2006 | Clayton |
| 7,478,178 | B2 | 1/2009 | Torudbakken et al. |
| 7,521,761 | B2 | 4/2009 | Satsukawa |
| 7,543,126 | B2 | 6/2009 | Lewis |
| 7,558,923 | B1* | 7/2009 | Bennett ............... G06F 12/0831 710/200 |
| 7,710,758 | B2 | 5/2010 | Jo |
| 7,793,345 | B2 | 9/2010 | Weber et al. |
| 7,921,431 | B2 | 4/2011 | Smart |
| 7,996,593 | B2 | 8/2011 | Blackmore et al. |
| 7,996,836 | B1 | 8/2011 | McCorkendale et al. |
| 8,036,243 | B2 | 10/2011 | Georgiou et al. |
| 8,069,325 | B2 | 11/2011 | Vermeulen et al. |
| 8,135,962 | B2 | 3/2012 | Strongin et al. |
| 8,346,997 | B2 | 1/2013 | Freimuth et al. |
| 8,719,526 | B2 | 5/2014 | Chen et al. |
| 8,789,170 | B2 | 7/2014 | Sastry et al. |
| 9,336,411 | B2 | 5/2016 | Rohleder et al. |
| 2004/0199700 | A1 | 10/2004 | Clayton |
| 2005/0091432 | A1 | 4/2005 | Adams et al. |
| 2005/0132365 | A1* | 6/2005 | Madukkarumukumana ............... G06F 9/5077 718/1 |
| 2005/0246453 | A1* | 11/2005 | Erlingsson ............ G06F 9/4555 710/1 |
| 2006/0041705 | A1 | 2/2006 | Bueti et al. |
| 2006/0075146 | A1 | 4/2006 | Schoinas et al. |
| 2006/0090053 | A1 | 4/2006 | Boning |
| 2006/0123416 | A1* | 6/2006 | Cibrario Bertolotti ............... G06F 9/45533 718/1 |
| 2006/0129747 | A1 | 6/2006 | Weber et al. |
| 2006/0195618 | A1* | 8/2006 | Arndt .................. G06F 9/45537 710/1 |
| 2006/0195645 | A1 | 8/2006 | Ryan et al. |
| 2006/0212606 | A1 | 9/2006 | Arndt et al. |
| 2007/0005919 | A1 | 1/2007 | Van Riel |
| 2007/0039045 | A1 | 2/2007 | McKee et al. |
| 2007/0192518 | A1 | 8/2007 | Rupanagunta et al. |
| 2009/0083829 | A1* | 3/2009 | Peterson ............. G06F 9/45558 726/1 |
| 2009/0157979 | A1 | 6/2009 | Gregg et al. |
| 2009/0230255 | A1 | 9/2009 | Lemonovich et al. |
| 2009/0275407 | A1* | 11/2009 | Singh ..................... G07F 17/32 463/31 |
| 2010/0042759 | A1 | 2/2010 | Srinivasan et al. |
| 2010/0162243 | A1* | 6/2010 | Barde ................. G06F 9/45558 718/100 |
| 2010/0180056 | A1 | 7/2010 | Matsuse |
| 2010/0268905 | A1 | 10/2010 | Reipold et al. |
| 2010/0318822 | A1 | 12/2010 | Scandurra et al. |
| 2011/0067114 | A1 | 3/2011 | Weber et al. |
| 2011/0119423 | A1 | 5/2011 | Kishore et al. |
| 2011/0191562 | A1 | 8/2011 | Chou et al. |
| 2012/0079479 | A1 | 3/2012 | Hakewill |
| 2012/0117301 | A1 | 5/2012 | Wingard |
| 2013/0111168 | A1 | 5/2013 | Circello et al. |
| 2014/0137231 | A1 | 5/2014 | Sastry et al. |
| 2014/0259128 | A1 | 9/2014 | Fear |
| 2016/0028728 | A1 | 1/2016 | Hampel et al. |
| 2016/0156632 | A1 | 6/2016 | Rohleder et al. |
| 2016/0350549 | A1 | 12/2016 | Hampel et al. |

FOREIGN PATENT DOCUMENTS

| | | |
|---|---|---|
| WO | 2014080247 A1 | 5/2014 |
| WO | 2014080248 A1 | 5/2014 |

OTHER PUBLICATIONS

Intel: "PCI-SIG Single Root I/O Virtualization (SR-IOV) Support in Intel® Virtualization Technology for Connectivity", Efficient Native Sharing of I/O Devices with Virtual Machines for enhancing I/O Performance, White Paper, Rev. 06/08-001US, 2008, pp. 1-4.
Notice of Allowance, U.S. Appl. No. 14/483,273, filed Apr. 21, 2017, 13 pages.
Fiorin et al. "A data protection unit for NoC-based architectures." Proceedings of the 5th IEEE/ACM international on Hardware/software codesign and system synthesis. ACM, 2007.
U.S. Appl. No. 14/483,273, filed Sep. 11, 2014.
Non-Final Office Action, U.S. Appl. No. 14/483,273, filed Dec. 9, 2016, 16 pages.
Notice of Allowance, U.S Appl. No. 14/483,273, filed Mar. 23, 2017, 5 pages.
Final Office Action, U.S. Appl. No. 14/647,089, filed Mar. 15, 2017, 40 pages.
Non-Final Office Action, U.S. Appl. No. 14/647,089, filed Jun. 30, 2016, 31 pages.
U.S. Appl. No. 14/647,089, filed May 23, 2015.
U.S. Appl. No. 14/899,338, filed Dec. 17, 2015.
Non-Final Office Action, U.S. Appl. No. 14/899,338, filed Apr. 4, 2017, 19 pages.
U.S. Appl. No. 14/442,241, filed May 12, 2015.
Notice of Allowance, U.S. Appl. No. 14/442,241, filed Jan. 29, 2016, 8 pages.
Non-Final Office Action, U.S. Appl. No. 14/442,241, filed Nov. 6, 2015, 4 pages.

* cited by examiner

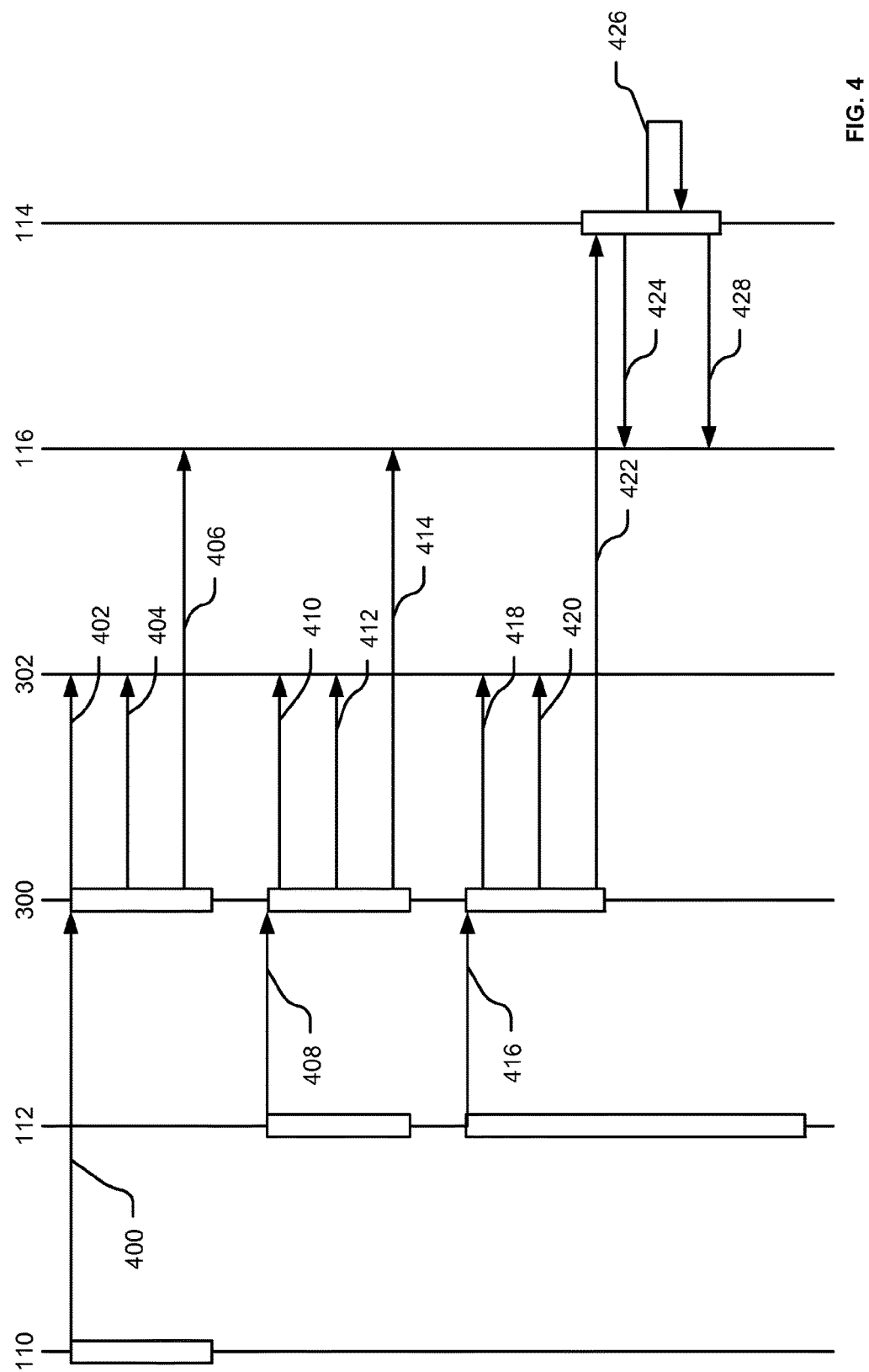

CONFLICT DETECTION CIRCUIT FOR RESOLVING ACCESS CONFLICT TO PERIPHERAL DEVICE BY MULTIPLE VIRTUAL MACHINES

FIELD OF THE INVENTION

This invention relates to a data processing device to support shareable resource access for a virtual machine image. This invention also relates to a method of shareable resource access for a virtual machine image. This invention further relates to an integrated circuit to support shareable resource access for a virtual machine image.

BACKGROUND OF THE INVENTION

In the field of data processing, computer systems typically comprised a single hardware platform, a single operating system and software applications. The hardware platform would comprise a single processing device, such as a microprocessor, connected to volatile memory, input device(s), output device(s) and a permanent or semi-permanent storage device, such as a so-called hard drive. The operating system would be loaded into the hardware platform and executed in order to support the software applications.

As computing power increased, the operating systems supporting the software applications were able to increase in sophistication and complexity such that so-called multitasking environments were able to be supported. However, due to the complexity and variety of the software applications available, the use of a single hardware platform to support these software applications did not always provide consistency and stability of execution.

With the advent of virtualisation, an additional layer, a virtual machine environment, has been introduced in computer systems between the hardware platform and the operating system and the software applications. With this new layer, which supported multiple operating systems, came the additional advantage of the ability to partition the hardware into virtual systems such that the software of one virtual system executing within one partition is not permitted to influence the software executing in another partition of another virtual system. Furthermore, such computing systems exhibit very good stability such that where a computing system comprises multiple virtual machines, failure of one virtual machine does not necessarily result in failure of other virtual machines supported by the hardware platform. Additionally, legacy software applications, designed for a single core system and not designed to operate in a multicore environment or to cooperate with other software applications, can be supported in a virtual environment.

So-called virtualisation has now extended to the field of embedded computing systems, which find many applications, for example in the automotive industry. In a relatively straightforward implementation on a multi-core Microcontroller Unit (MCU), it is known to partition available resources of the MCU so that different virtual machines can be supported. In this simple example, each virtual machine, or guest, is supported by a respective processor core of the MCU. So, for example, a first virtual machine is supported by and dedicated to a first processor core and a second virtual machine is supported by and dedicated to a second processor core, respectively. A virtual machine monitor, sometimes referred to as a "hypervisor", is functionally located between the virtual machines and non-dedicated hardware, for example memories or peripherals. The hypervisor serves to manage interaction between each virtual machine and underlying resources of the hardware platform, for example a peripheral.

However, when a peripheral has to be shared by virtual machines, so-called exceptions or "traps" are generated, which call or "trap into" the hypervisor to ensure the hypervisor can maintain control over such a non-dedicated resource. This results in a significant performance reduction by the virtual machines. Therefore, solutions are required that allow fast access from a host to one or more peripherals without dedicating them to the host.

US patent publication number US 2006/0195618 A1 relates to a data processing system, method and computer program product for the creation and initialisation of a virtual adapter on a physical adapter that supports virtual adapter level virtualisation. In this publication, a management system is described that can request peripherals to allocate resources to specific virtual machines. However, in the system described actual resources, for example configuration or I/O registers, exist to allow access of the virtual peripherals rather than only appear to exist, for example channels of an Analogue-to-Digital Converter (ADC).

US patent publication number US 2011/0119423 A1 relates to an assignment of resources in an I/O virtualisation system. Hardware described in this document is significantly extended to provide so-called full virtualised clones of hardware to core; interfaces and a management Central Processing Unit (CPU) are especially introduced. Thus the system does not provide for direct, unencumbered, access to peripherals, but instead all accesses are managed and thus slowed down.

US patent publication number US 2010/0162243 A1 relates to use of a memory management unit to switch between direct peripheral access and virtualisation. However, such a regime excludes access by other virtual machines to the peripheral when direct access of the virtual machine to the peripheral is provided. Alternatively, virtualised access to the peripheral is provided in which case the above-mentioned performance penalties apply.

US patent publication number US 2007/0192518 A1 relates to an apparatus for performing input/output sharing and virtualisation. The system described in this document uses a centralised management entity (a so-called IOSV processor) that is used for virtualisation of large I/O accesses, (for example using the Small Computer System Interface (SCSI) over TCP/IP). In such an environment, task switching overhead is insignificant compared to transmission and reaction times of the peripheral. Thus, the solution described is unsuitable for fast, direct, peripheral register access.

SUMMARY OF THE INVENTION

The present invention provides a processing device, a microprocessor, a method, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments will be described, by way of example only, with reference to the drawings. In the drawings, like reference numbers are used

FIG. 4 is an event sequence diagram of an example of a method as may be performed by the device of FIG. 1.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

In this respect, an embedded system is a system designed for specific control functions within a larger system, which may have real-time computing constraints, and which is embedded, or to be embedded, as part of a complete apparatus including other hardware and mechanical parts. The embedded system can comprise a combination of hardware and software. The embedded system can be of a fixed capability or programmable. The embedded system can comprise one or more processing devices, such as a microprocessor or other logic circuits.

A microprocessor can, for example, be a central processing unit (CPU) and/or a coprocessor and/or a digital signal processor and/or an embedded processor and/or a microcontroller. The microprocessor may for example include one or more processor cores, and other components, for example peripherals, connected to each other e.g. through a bus. The peripherals may for example include memory, hardware accelerators, external bus drivers, Pulse Width Modulation (PWM) modules, Analog to Digital Converters (ADC) or a timer modular other suitable peripherals.

Figure 1:
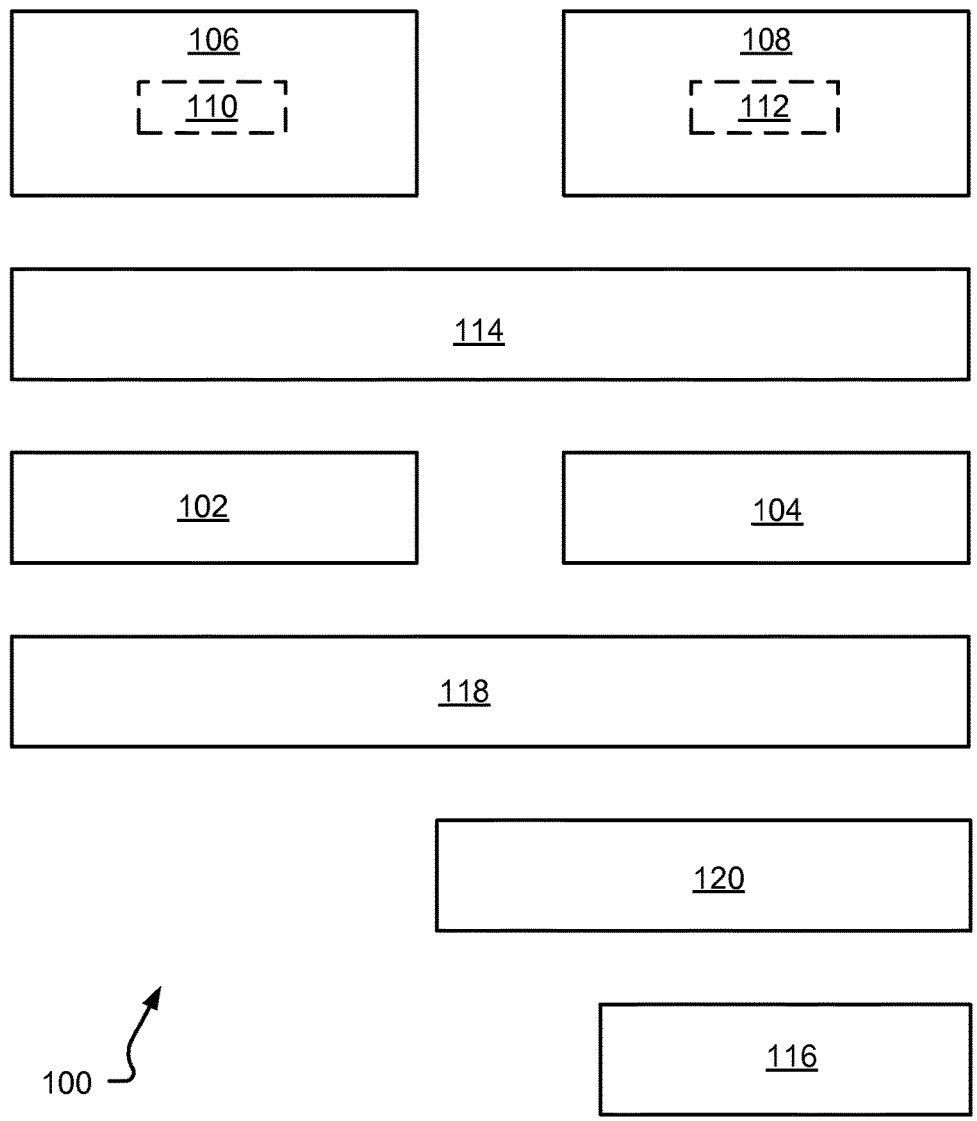
FIG. 1 is a schematic diagram of an example of a processing device.

Referring to FIG. 1, the processing device 100 shown therein may form part of an embedded system, such as in an automotive vehicle. The processing device can for example be a microprocessor or other suitable logic circuit As shown, the processing device 100 may one or more processor cores 12,14 supporting two or more virtual machine images 110, 112. In FIG. 1, for sake of simplicity and ease of understanding a first processor core 12 and a second processor core 14 are shown, each supporting a respective virtual machine image 110,112, however it will be apparent that there may be more or less processor cores and that a processor core may support multiple virtual machine images. Furthermore, although in this example the first core 102 may support the first virtual machine image 110 and the second core 104 may support the second virtual machine image 108, the skilled person will appreciate that this example need not relate to multi-core devices and the first and second virtual machine images 110, 112 can be supported by a single core, for example the first core 102 or the second core 104 only.

Figure 3:
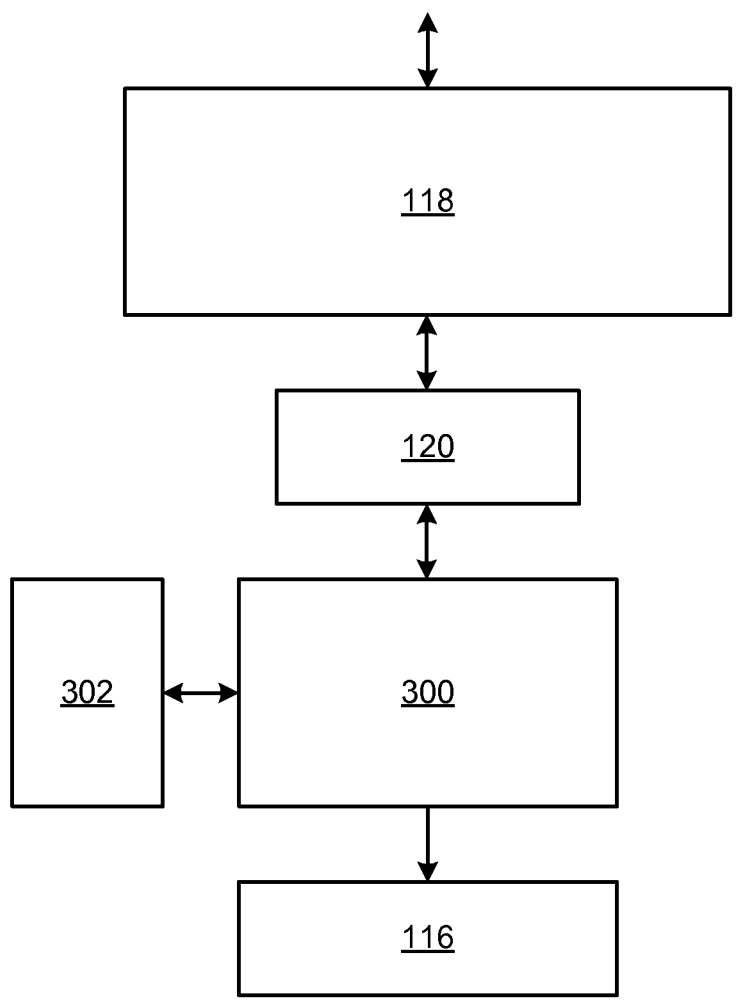
FIG. 3 is a schematic diagram of an example of a conflict detection unit which can be used in the device of FIG. 1.

The shown example further includes a virtual machine monitoring unit 114 capable of communicating with the virtual machine images 110. 112 and a shareable resource 116 shareable between the virtual machine images. The shareable resource may for example be a peripheral of the processing device 100 consisting of several internal channels, such as a Pulse Width Modulation (PWM) module, an Analog to Digital Converter (ADC) or a timer module, As shown in FIG. 3, the device includes a conflict detection unit 300 capable of communicating with the virtual machine monitoring unit 114 and the virtual machine images 110,112 and arranged to detect, when in use, an access conflict caused by more than one virtual machine image attempting to access initially the shareable resource. when in use, the conflict detection unit refers the access conflict, in response to detection thereof, to the virtual machine monitoring unit for resolving the access conflict, thereby handling an access request before the virtual machine monitoring unit.

The device 100 allows to minimise, or at least reduce, involvement of the virtual machine management unit, thereby reducing access time with respect to the shareable resource 116 and so improving access performance and real-time latency while still supporting virtualisation where different virtual machines may need to access a peripheral resulting in a need for conflict resolution. The advantages can be obtained without completely replicating resources, for example registers: only memory to store conflict information is required. Of course, the above advantages are examples only, and these or other advantages may be achieved. Further, the skilled person will appreciate that not all advantages stated above are necessarily achieved by embodiments within the scope of the claims In the shown example. the first processing core 102 and the second processing core 104 respectively provide a first partitioned area 106 and a second partitioned area 108. The first and second partitioned areas 106, 108 may be provided to support the first virtual machine image 110 and the second virtual machine image 112, respectively.

In this example, the a virtual machine monitoring unit 114, sometimes referred to as a "hypervisor" is functionally, disposed between the cores 102, 104 and the virtual machine images 110, 112. In order to support communication between the first and second cores 102, 104 and the shareable resource 116a bus 118, for example a so-called crossbar bus, is provided. The bus 118 is operably coupled to an Advanced High performance Bus (AHB) to IP Sky Blue, also known as AIPS, bus bridge 120. The AIPS bridge is operably coupled to the shareable resource 116. In this particular example, the shareable resource 116 is a peripheral, such as an Analogue-to-Digital Converter (ADC) unit having multiple channels. Consequently, in this example, the AIPS bridge 120 is required to interface the two bus protocols. However, the skilled person will appreciate that other kinds of interface or no special interface may be employed in relation to different ways of connecting shareable resource 116.

The first and second virtual machine images 110, 112 may be arranged to execute any desired functionality for the virtual machine supported thereby using the resources of the processing device 100. In this example, it is supposed that the first and second virtual machine images 110, 112 require access to the peripheral 116. Further details of functionality of the first and second virtual machine images 110, 112 will not be described herein in order to preserve clarity and conciseness of description and not to distract from the core teachings of the embodiments set forth herein.

Figure 2:
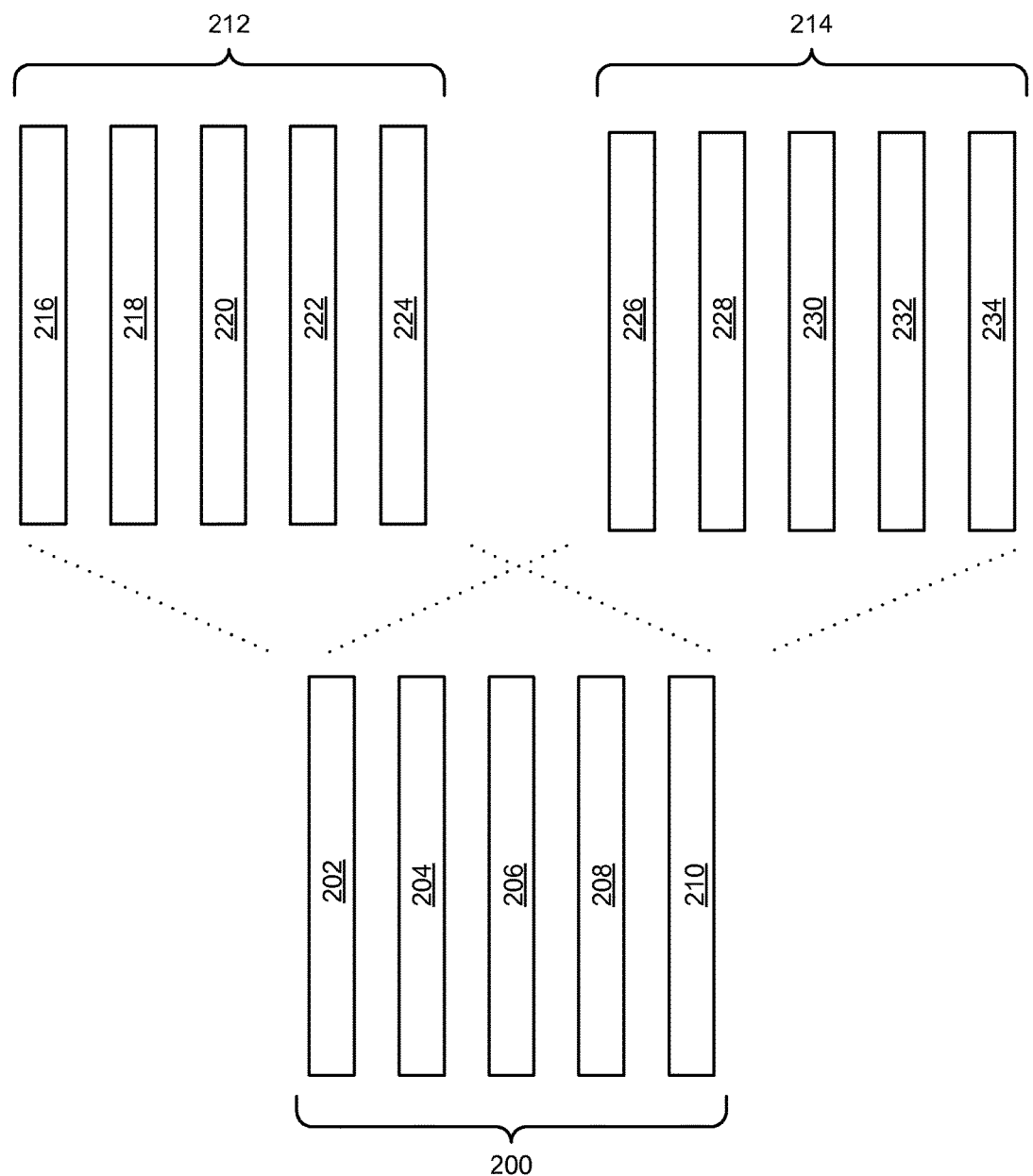
FIG. 2 is a schematic diagram of an example of registers of a shareable resource which can be used in the example of FIG. 1.

Referring to FIG. 2, shown therein is an interface of peripheral 116 which allows access by software running on the processor cores 106,108, such as the virtual machines provided by the first and second virtual machine images 110, 112. The interface comprises a set of registers 200 which comprises: a channel 1 control register 202, a channel 1 data register 204, a channel 2 control register 206, a channel 2 data register 208 and a module enable register 210. For the purposes of shared access thereto, two virtual images of the register set 200 are supported by the conflict resolution unit 300 and are "visible" within the address space of the AIPS bridge, one for each virtual machine image 110, 112 and mapping registers out of the set 200 to a respective set of image registers. Thus, each virtual image contains a set of registers of the register set 200 associated to the respective virtual machine image. In this respect, a first set of image registers 212 is associated with the first virtual machine image 110 and a second set of image registers 214 associated with the second virtual machine image 112. The first set of image registers 212 comprises a first channel 1 control register image 216, a first channel 1 data register image 218, a first channel 2 control register image 220, a first channel 2 data register image 222 and a first module enable register image 224. The second set of image registers 214 comprises a second channel 1 control register image 226, a second channel 1 data register image 228, a second channel 2 control register image 230, a second channel 2 data register image 232 and a second module enable register image 234. The first set of image registers 212 has a first address range associated therewith and the second set of image registers 214 has a second address range associated therewith that does not overlap with the first address range. The skilled person will appreciate that the processing device 100 only comprises one real set of registers, i.e. no additional hardware resource for storing values written to or read from the registers is introduced.

Turning to FIG. 3, a conflict detection unit 300 is disposed between the bridge 118 and the peripheral 116. In this example, the conflict detection unit 300 is an address space management unit. The conflict detection unit 300 can be disposed wherever it is expedient to do so. For example, the conflict detection unit 300 can be integrated into the peripheral 116 or into a memory protection unit (not shown) that may be part of the bus 118 or the bus bridge 120. In this example, the conflict detection unit 300 is a dedicated logic circuit module disposed between the AIPS bridge 120 and the peripheral 116, and is operably coupled to the peripheral 116 and the AIPS bridge 120. The conflict detection unit 300 is capable of communicating with the first and/or second virtual machine images 110, 112 and the peripheral 116.

In the example of FIG. 3, a memory unit 302 is operably coupled to the conflict detection unit 300. The memory unit 302 is arranged to store at least one data bit relating to the use of the peripheral 116 by the first virtual machine image 110 or the second virtual machine image 112. Notably, the at least one data bit may represent whether or not the peripheral is in use by a respective virtual machine image, and optionally, indicate which virtual machine image.

The device 100 may perform a method as illustrated in FIG. 4, which is explained herein below with reference to the operation of the device 100. In operation, as illustrated with the chart of FIG. 4, the first virtual machine image 110, as part of the application it is executing, may need to send data to the peripheral 116, e.g. in this example in relation to an analogue to digital conversion. In particular, the first virtual machine image 110 needs to access the first channel of the peripheral 116 in order to write data to the channel 1 control register 202, for example to initiate an analog-to-digital conversion. According to the implementation of the first virtual machine image 110, the peripheral 116 uses the virtual registers 216, 218, 220, 222, 224, i.e. the first set of image registers 212. The first virtual machine image 110 therefore communicates (Block 400) a request to the conflict detection unit 300 containing control data that the first virtual machine image 110 requires to be written to the first image of the channel 1 control register 216.

In response to the request from the first virtual machine image 110, the conflict detection unit 300 accesses (Block 402) the memory unit 302 in order to determine if the channel 1 control register 202 is being used by the second virtual machine image 112 via the second set of image registers 214, or another virtual machine image via another set of image registers (not shown). In the event that the conflict detection unit 300 determines that the memory unit 302 does not contain data indicative of the channel 1 control register 202 being in use by another virtual machine, for example a bit field in the memory unit 302 reserved to indicate when the channel 1 control register 226 is "in use", the conflict detection unit 300 updates (Block 404) the memory unit 302 in order to record the fact that the first virtual machine image 110 is accessing the channel 1 control register 202 via the first image of the channel 1 control register 216, and actions the request to write to the channel 1 control register 202 by writing (Block 406) the data received from the first virtual machine image 110 to the first image of the channel 1 control register 216. In this example, the communication (Block 400) is an address transmitted from the AIPS bridge 120 to the peripheral 116, and the communication (Block 406) between the conflict detection unit 300 and the peripheral 116 is the conflict detection unit 300 allowing the address transmitted from the AIPS bridge 120 to the peripheral (Block 400) to "pass through" to the peripheral 116.

Subsequently, in this example to demonstrate the functionality of the collision detection unit 300, the second virtual machine image 112 communicates (Block 408) a request to the conflict detection unit 300 containing control data that the second virtual machine image 112 requires to be written to the second image of the channel 2 control register 230. In response to the request from the second virtual machine image 112, the conflict detection unit 300 accesses (Block 410) the memory unit 302 in order to determine if the channel 2 control register 206 is being used by the first virtual machine image 110 via the first image of the channel control register 220 of the first set of image registers 212 or another virtual machine image via another set of image registers (not shown). In the event that the conflict detection unit 300 determines that the memory unit 302 does not contain data indicative of the channel 2 control register 206 being in use by another virtual machine, for example another bit field in the memory unit 302 reserved to indicate when the channel 2 control register 220 is "in use", the conflict detection unit 300 updates (Block 412) the memory unit 302 in order to record the fact that the second virtual machine image 112 is accessing the channel 2 control register 206 via the second image of the channel 2 control register 230, and actions the request to write to the channel 2 control register 202 by writing (Block 414) the data received from the second virtual machine image 112, via the second image of the channel 2 control register 230. Again, in this example, the communication (Block 408) is an address transmitted from the AIPS bridge 120 to the peripheral 116, and the communication (Block 414) between the conflict detection unit 300 and the peripheral 116 is the conflict detection unit 300 allowing the address transmitted from the AIPS bridge 120 to the peripheral (Block 408) to "pass through" to the peripheral 116.

Thus far, no conflicts have been detected by the conflict detection unit 300. Therefore, all accesses to different registers of the same peripheral 116 by both virtual machines are permitted, unhindered by an intervention of the virtual machine monitoring unit 114. However, the second virtual machine image 112 then needs to write to the channel 1 control register 202. For this, the second virtual machine image 112 issues a request (Block 416) to the conflict detection unit 300 (containing data that the second virtual machine 112 needs to write) to access the second image of the channel 1 control register 226.

In response to the request from the second virtual machine image 112, the conflict detection unit 300 accesses (Block 418) the memory unit 302 in order to determine if the channel 1 control register 202 is being used by the first virtual machine image 110 or another virtual machine image. In this example, the channel 1 control register 202 is being used by the first virtual machine image 110 and this arrangement is already recorded in the memory unit 302 as described above. Therefore, the conflict detection unit 300 determines that the memory unit 302 contains data indicative of the channel 1 control register 202 is in use, namely that the bit field in the memory unit 302 (reserved to indicate when the first channel 1 control register image 216 is "in use") has been set (as described above). Consequently, the conflict detection unit 300 updates (Block 420) the memory unit 302 to indicate that a conflict situation now exists and refers (Block 422) the detected conflict to the virtual machine management unit 114 along with the data that the second virtual machine image 112 needs writing to the channel 1 control register 202 by setting a trap into the virtual machine management unit 114 in respect of the writing of the second channel 1 control register image 226.

In response to the trap, the virtual machine management unit 114 enters into a so-called "hypervisor" mode and reads (Block 424) the content of the channel 1 control register 202. The virtual machine management unit 114 then merges (Block 426) the control data requested to be written by the second virtual machine 112 with the content of the channel 1 control register 202. Thereafter, the virtual machine management unit 114 writes (Block 428) the merged data into the channel 1 control register 202 of the peripheral 116.

Note that, in this example, the virtual machine management unit 114 runs in a special mode of the processing device 100, for example a hypervisor mode (sometimes referred to as a "hypervisor state") causing its accesses to be ignored by the conflict detection unit 300. Also, the reference (Block 422) to the virtual machine management unit 114 may occur due to a standard mechanism, for example a so called "bus error" triggered by the conflict resolution unit 300, which could be configured to automatically "trap" into the virtual machine management unit 114. In such circumstances, explicit communication of the data (that the second virtual machine image 112 needs writing) from the conflict detection unit 300 to the virtual machine management unit 114 may not be necessary as it will be provided by the "bus error" and "trap" mechanisms.

Similarly, in the event that first the converse situation arises and the first virtual machine image 110 attempts to write data to the channel 2 control register image 220, the above procedure (Blocks 416 to 428) are executed in respect of the channel 2 control register 206 and images thereof.

As can be seen from the above example operational description, the virtual machine management unit 114 is bypassed in the first instance by the first and/or second virtual machine images 110, 112 in order to access the peripheral 116 or other shareable resource. However, when the conflict detection unit 300 detects a conflict, the conflict is referred to the virtual machine management unit 116 for resolution.

The invention may also be implemented in a computer program product for running on a programmable apparatus, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored, e.g. internally in the programmable apparatus, on a computer readable storage medium or transmitted to the programmable apparatus via a computer readable transmission medium. All or some of the computer program may be provided on tangible or non-tangible computer readable media permanently, removably or remotely coupled to the programmable apparatus. The computer readable media may be transitory or non transitory and include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader scope of the invention as set forth in the appended claims. For example, although the example described herein refers to two virtual machine images, the skilled person should appreciate that a greater number of virtual machine images can be employed.

In another embodiment, the conflict detection unit 300 may be arranged to manage access to the registers (or other resources) at a greater level of granularity than described herein. For example, the conflict detection unit 300 can manage access to a predetermined range of addresses within a given register, i.e. bits, as opposed to the entire register "en bloc"; ranges of other addresses within the register can be similarly managed. This would allow access to the same register by different virtual machine images provided different bit ranges are accessed. In a further embodiment, more than one register, for example the channel 1 control register 202 and the channel 1 data register 204, can be treated as a single entity from the perspective of data access by the conflict detection unit 300. This embodiment, advantageously, requires fewer resources to store information concerning usage and/or conflicts. In yet another embodiment, in order to obviate the use of images of registers and their related different addresses, so-called partition identifiers or other identifiers can be used to identify accessors, for example the first and second virtual machine images 110, 112, of a given register. The identifiers can be communicated to the conflict detection unit 300 via a bus for communicating control signals (not shown in FIG. 1).

Some of the above embodiments, as applicable, may be implemented using a variety of different information processing architectures for integrated circuit. For example, although FIG. 1 and the discussion thereof describe an exemplary architecture, this is presented merely to provide a useful reference in discussing various aspects of the invention. Of course, the description has been simplified for purposes of discussion, and it is just one of many different architectures or implementations that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the examples illustrated herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. Operations may be performed in parallel when suitable and/or multiple operations may be combined into a single operation, and/or a single operation may be distributed in additional operations. Moreover, alternative embodiments may include multiple instances of a particular operation, and the order of operations may be altered in various other embodiments.

Also, for example, although the processing device 100 comprises, in the example described herein, an AIPS bridge between the bus 118 and the shareable resource 116, the skilled person should appreciate that other types of bridge can be employed or even omitted in some embodiments.

The examples set forth herein, or portions thereof, may be implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A processing device, comprising:
a first processor core supporting a first virtual machine;
a second processor core supporting a second virtual machine;
a hypervisor capable of communicating with the first and second virtual machines;
a peripheral device shareable between the first and second virtual machines through an interface of the peripheral device, the interface comprising a set of registers; and
a conflict detection circuit capable of communicating with the hypervisor and the first and second virtual machines,
wherein the conflict detection circuit is arranged to support a first and a second virtual image of the set of registers, each virtual image containing a set of register images each mapped to corresponding ones of the set of registers, wherein the first virtual image is associated with the first virtual machine and the second virtual image is associated with the second virtual machine,
wherein the conflict detection circuit is arranged to handle an access request to the peripheral device before the hypervisor by:
detecting an access conflict caused by a current write request by the second virtual machine to access a register of the peripheral device via the corresponding register image of the second virtual image, wherein the register was previously being accessed by the first virtual machine; and
referring the access conflict in response to detection thereof to the hypervisor for resolving the access conflict, wherein the hypervisor is bypassed in the absence of the access conflict;
wherein, the hypervisor is configured to merge data of the current write request with data previously stored by the first virtual machine, and to write the merged data to the peripheral device.

2. The processing device of claim 1, wherein the first virtual machine comprises a first virtual machine image and the second virtual machine comprises a second virtual machine image.

3. The processing device of claim 2, wherein the second virtual machine is arranged to bypass the hypervisor when attempting initial access of the peripheral device.

4. The processing device of claim 2, wherein access by the first virtual machine and the second virtual machine to the peripheral device is identifiable to the conflict detection circuit by a first identifier and a second identifier associated with the first virtual machine and the second virtual machine, respectively, as opposed to by an address associated with the peripheral device.

5. The processing device of claim 1, wherein at least one of the first and second virtual machines is arranged to bypass the hypervisor when attempting initial access of the peripheral device.

6. The processing device of claim 1, wherein the conflict detection circuit is operably coupled to a memory for storing at least one data bit in response to receipt of an attempt to access the peripheral device, said data bit indicating the access in respect of the peripheral device.

7. The processing device of claim 6, wherein the conflict detection circuit is arranged to refer to the memory in response to a detection of an attempt to access the peripheral device, in order to determine whether the attempted access constitutes, if permitted, the access conflict in respect of the peripheral device.

8. The processing device of claim 1, wherein the conflict detection circuit is arranged to generate a trap into the hypervisor in response to a determination that the attempted access constitutes, if permitted, the access conflict.

9. The processing device of claim 1, wherein the conflict detection circuit is arranged to provide more than one virtual image of the set of registers.

10. The processing device of claim 9, wherein the access conflict is a conflict in respect of the more than one virtual machine accessing the same register of the peripheral device via different register images.

11. The processing device of claim 1, wherein a memory operatively coupled to the conflict detection circuit is arranged to store data bits to identify access to the peripheral device via the first and second virtual image.

12. The processing device of claim 1, wherein the peripheral device comprises a range of addresses of a register and the access conflict is in respect of more than one virtual machine accessing the same range of addresses of the peripheral device.

13. The processing device of claim 1, wherein the conflict detection circuit to set a bit field in a memory to indicate that the peripheral device is being accessed by the first virtual machine.

14. A method of peripheral access for a plurality of virtual machines, the method comprising:
supporting a first virtual machine on a first processor core;
supporting a second virtual machine on a second processor core;
supporting a hypervisor capable of communicating with the first and second virtual machines;
supporting a peripheral device shareable between the first and second virtual machines through an interface of the peripheral device, the interface comprising a set of registers;
supporting a conflict detection circuit capable of communicating with the hypervisor and the first and second virtual machines,
wherein the conflict detection circuit is arranged to support a first and a second virtual image of the set of registers, each virtual image containing a set of register images each mapped to corresponding ones of the set of registers, wherein the first virtual image is associated with the first virtual machine and the second virtual image is associated with the second virtual machine,
wherein the conflict detection circuit is arranged to handle an access request to the peripheral device before the hypervisor by:
detecting an access conflict caused by a current write request by the second virtual machine to access a register of the peripheral device via the corresponding register image of the second virtual image, wherein the register was previously being accessed by the first virtual machine; and
referring the access conflict in response to detection thereof to the hypervisor for resolving the access conflict, wherein the hypervisor is bypassed in the absence of the access conflict;
wherein, the hypervisor is configured to merge data of the current write request with data previously stored by the first virtual machine, and to write the merged data to the peripheral device.

15. The method of claim 14, further comprising:
setting a bit field in a memory operably coupled to the conflict detection circuit to indicate that the peripheral device is being accessed by a virtual machine.

16. A non-transitory computer program product for running on a programmable apparatus, at least including code portions for performing steps of a method when run on a programmable apparatus, the method comprising:
supporting a first virtual machine on a first processor core;
supporting a second virtual machine on a second processor core;
supporting a hypervisor capable of communicating with the first and second virtual machines;
supporting a peripheral device shareable between the first and second virtual machines through an interface of the peripheral device, the interface comprising a set of registers;
supporting a conflict detection circuit capable of communicating with the hypervisor and the first and second virtual machines,
wherein the conflict detection circuit is arranged to support a first and a second virtual image of the set of registers, each virtual image containing a set of register images each mapped to corresponding ones of the set of registers, wherein the first virtual image is associated with the first virtual machine and the second virtual image is associated with the second virtual machine,
wherein the conflict detection circuit is arranged to handle an access request to the peripheral device before the hypervisor by:
detecting an access conflict caused by a current write request by the second virtual machine to access a register of the peripheral device via the corresponding register image of the second virtual image, wherein the register was previously being accessed by the first virtual machine; and
referring the access conflict in response to detection thereof to the hypervisor for resolving the access conflict, wherein the hypervisor is bypassed in the absence of the access conflict;
wherein, the hypervisor is configured to merge data of the current write request with data previously stored by the first virtual machine, and to write the merged data to the peripheral device.

* * * * *